Patented Feb. 24, 1953

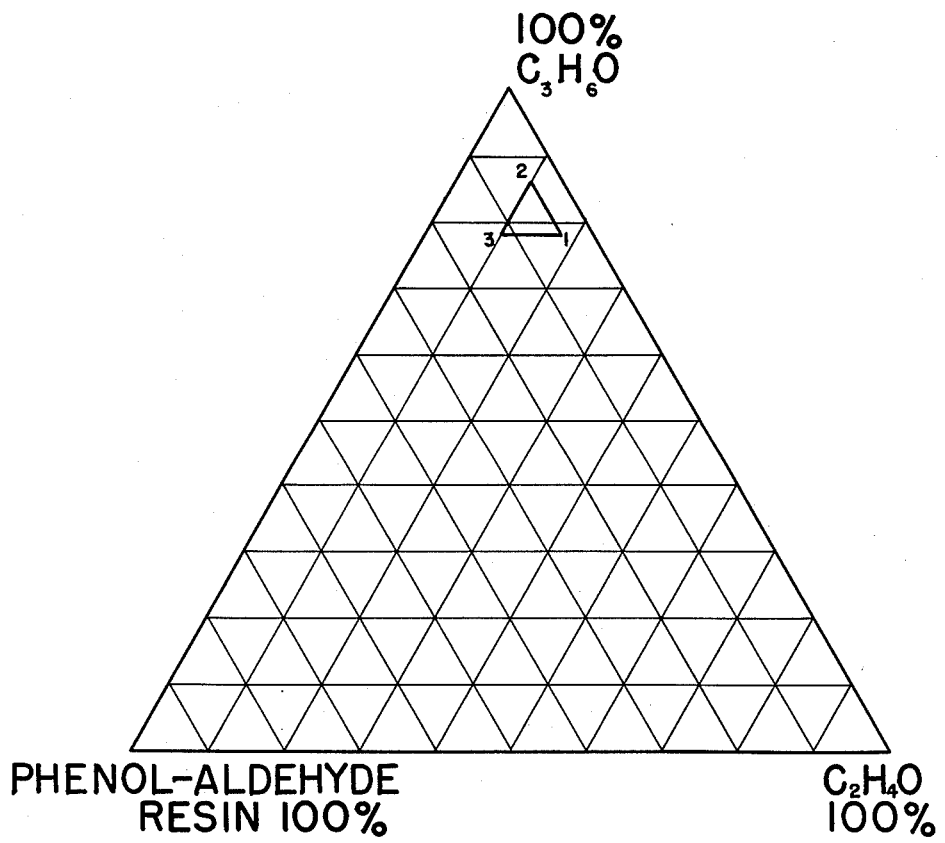

2,629,706

UNITED STATES PATENT OFFICE 2,629,706

CERTAIN OXYALKYLATED DERIVATIVES OF FUSIBLE RESINS

Melvin De Groote, St. Louis, and Bernhard Keiser, Webster Groves, Mo., assignors to Petrolite Corporation, Wilmington, Del., a corporation of Delaware Continuation of application Serial No. 129,708, November 28, 1949. This application May 24, 1952, Serial No. 289,773

5 Claims. (Cl. 260—53)

The present invention is concerned with certain new chemical products, compounds, or compositions which have useful application in various arts. This application is a continuation of our application Serial No. 129,708, filed November 28, 1949, and now abandoned.

Our Patent 2,557,081, granted June 19, 1951, on an application filed concurrently with said application Serial No. 129,708, describes the breaking of petroleum emulsions by means of certain resins oxyalkylated with both ethylene oxide and propylene oxide in stated relative proportions. The new products of the present application are a small group of the compositions described in our said patent, which compositions have outstanding properties, presumably because of the specific proportions of the three constituents, the resin, the ethylene oxide, and the propylene oxide, from which they are prepared.

Our Patent 2,499,370, granted March 7, 1950, describes certain hydrophile synthetic products which are the oxyalkylation products of alpha,-beta-alkylene oxides having not more than four carbon atoms and oxyalkylation-susceptible, fusible, organic solvent-soluble, water-insoluble phenol-aldehyde resins, which resins are derived from difunctional monohydric phenols and aldehydes having not over 8 carbon atoms. The resins described as reactants for the production of the demulsifiers of our said patent are those used in producing the particular small class of oxyalkylated products of the present application, except that, whereas resins described in said patent are derived from difunctional phenols having an ortho or para hydrocarbon substituent with 4 to 12 carbon atoms, we have found that resins derived from a phenol having an ortho or para hydrocarbon substituent having 14 carbon atoms gives valuable products and, therefore, include in the present invention compounds derived from such phenols.

In the products of the present invention, the selected phenol-aldehyde resin derived from an aldehyde having not more than 8 carbon atoms and a phenol of the formula

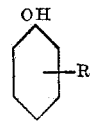

in which R is a hydrocarbon radical having 4 to 14 carbon atoms and substituted in the ortho or para position is oxyalkylated with both ethylene oxide and propylene oxide, in such weight proportions of the three reactants as to come within the area defined by points 1, 2 and 3, on the accompanying chart, which is a conventional representation of a 3-component system, proportions being weight proportions of the three components. The line 1—2 represents about 4% resin; the line 3—1 represents about 88% propylene oxide; and the line 2—3 represents 10% ethylene oxide.

Products, as above described briefly, and hereinafter described in detail, are particularly effective in breaking petroleum emulsions of the water-in-oil type. Oil field emulsions of this type are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

The new products herein described are useful as wetting, detergent and leveling agents in the laundry, textile and dyeing industries; as wetting agents and detergents in the acid washing of building stone and brick; as wetting agents and spreaders in the application of asphalt in road building and the like; as a flotation reagent in the flotation separation of various aqueous suspensions containing negatively charged particles, such as sewage, coal washing waste water, and various trade wastes and the like; as germicides, insecticides, emulsifying agents, as, for example, for cosmetics, spray oils, water-repellent textile finishes, as lubricants, etc.

In our Patent 2,499,370, the application for which was copending with our said application Serial No. 129,708 we have described certain new products or compositions of matter which are of unusual value in certain industrial applications requiring the use of products or compounds showing surface-activity. We have found that if solvent-soluble resins are prepared from difunctional (directive) phenols in which one of the reactive (o or p) positions of the phenol is substituted by a hydrocarbon radical having 4 to 12 carbon atoms, in the substantial absence of trifunctional phenols, and aldehydes having not over 8 carbon atoms, subsequent oxyalkylation, and specifically oxyethylation, yields products of unusual value for demulsification purposes, provided that oxyalkylation is continued to the degree that hydrophile properties are imparted to the compound. By "substantial absence of trifunctional phenols," we mean that such materials may be present only in amounts so small that they do not interfere with the formation of a solvent-soluble resin product and, especially, of a hydrophile oxyalkylated derivative thereof. The actual amounts to be tolerated will, of course, vary with the nature of the other components of the system; but in general the proportion of trifunctional phenols which is tolerable in the conventional resinification procedures illustrated herein is quite small. In experiments following conventional procedure using an acid catalyst in which we have included trifunctional phenols in amounts of from 3% to about 1% or somewhat less based on the difunctional phenols, we have encountered difficulties in preparing oxyalkylated derivatives of the type useful in the practice of this invention.

Such products are rarely a single chemical compound but are almost invariably a mixture of cogeners. One useful type of compound may be exemplified in an idealized simplification in the following formula:

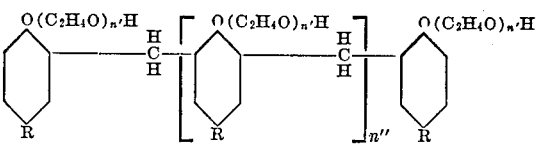

which, in turn, is considered a derivative of the fusible, organic solvent-soluble resin polymer:

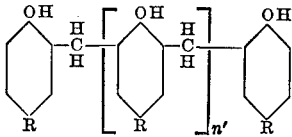

In these formulas $n''$ represents a numeral varying from 1 to 13, or even more, provided that the parent resin is fusible and organic solvent-soluble; $n'$ represents a numeral varying from 1 to 20, with the proviso that the average value of $n'$ be at least 2; and R is a hydrocarbon radical having at least 4 and not over 12 carbon atoms. These numerical values of $n'$ and $n''$ are, of course, on a statistical basis.

Said previously described invention or inventions involves the use, as a demulsifier, of a hydrophile oxyalkylated 2, 4, 6 (i. e., 2, 4, or 6) $C_4$- to $C_{12}$ hydrocarbon-substituted monocyclic phenol—$C_1$- to $C_8$-aldehyde resin, in which the ratio of oxyalkylene groups to phenolic nuclei is at least 2:1 and the alkylene radicals of the oxyalkylene groups are ethylene, propylene, butylene, hydroxypropylene or hydroxybutylene corresponding to the alpha-beta alkylene oxides, ethylene oxide, alpha-beta propylene oxide, alpha-beta butylene oxide, glycide and methyl glycide.

We have found that if one uses both propylene oxide and ethylene oxide as the oxyalkylating agent in certain predetermined ratios, as hereinafter described, in a large number of instances one obtains a much better demulsifier than is possible by the use of either alkylene oxide alone in the absence of the other alkylene oxides.

Stated another way, the same resins described in the aforementioned co-pending applications are employed as a raw material and subjected to oxyethylation with both ethylene oxide and propylene oxide. For this reason we will describe the resins used as raw materials for producing the products of this invention by reference to our said Patent 2,499,370, and specifically, we refer to the general discussion of the production of the resins in that patent for a discussion of the considerations involved in the production of suitable resins and to Examples 1a through 103a of that patent for specific examples of such resins.

However, we wish to point out that in addition to the resins described in our said patent, useful products of the present invention may be prepared from phenols having substituents having up to 14 carbon atoms, as, for example, difunctional tetradecyl phenols which are available at an attractive price. One grade of these particular phenols consists of a mixture representing about 90% para-substituted phenol, 5% ortho-substituted phenol, and 5% meta-substituted phenol. Although the amount of meta-substituent is comparatively large compared with other difunctional phenols, it appears unobjectionable, due to the comparatively large side chain. For example, compare with the preparation of soluble thermoplastic phenols from cardanol, or side chain hydrogenated cardanol. One grade of this material is manufactured by the Oronite Chemical Co. and designated as tetradecyl phenol, grade 14-6069P. We have prepared resins from such phenol alone, or in admixture, following the same procedure described in specific examples preceding. As a specific example we have substituted 290 grams of this particular tetradecyl phenol in Examples 99a, 100a, and 101a of Patent 2,499,370 and have obtained products having similar characteristics, except that, if anything, the resins were somewhat darker and somewhat more fluid. Similarly, tetradecyl phenol can be used in combination with the other aldehydes described, and will, for practical purposes, act very similarly to dodecyl phenol.

Obviously, mixtures of reactants may be employed, as, for example, a mixture of para-butylphenol and para-amylphenol, or a mixture of para-butyl-phenol and para-hexylphenol, or para-butylphenol and para-phenylphenol. It is extremely difficult to depict the structure of a resin derived from a single phenol. When mixtures of phenols are used, even in equimolar proportions, the structure of the resin is even more indeterminable. In other words, a mixture involving para-butylphenol and para-amylphenol might have an alternation of the two nuclei, or one might have a series of butylated nuclei and then a series of amylated nuclei. If a mixture of aldehydes is employed, for instance, acetaldehyde and butyraldehyde, or acetaldehyde and formaldehyde, or benzaldehyde and acetaldehyde, the final structure of the resin becomes even more complicated, and possibly depends upon the relative reactivity of the aldehydes. For that matter, one might be producing simultaneously two different resins, in what would actually be a mechanical mixture, although such mixture might exhibit some unique properties, as compared with a mixture of the same two resins prepared separately.

The oxyalkylation of resins of the kind from which the products used in the practice of the present invention are prepared is advantageously catalyzed by the presence of an alkali. Useful alkaline catalysts include soaps, sodium acetate, sodium hydroxide, sodium methylate, caustic potash, etc. The amount of alkaline catalyst usually is between 0.2% to 2%. The temperature employed may vary from room temperature to as high as 200° C. The reaction may be conducted with or without pressure, i. e., from zero pressure to approximately 200 or even 300 pounds gauge pressure (pounds per square inch). In a general way, the method employed is substantially the same procedure as used for oxyalkylation of other organic materials having reactive phenolic groups.

It may be necessary to allow for the acidity of a resin in determining the amount of alkaline catalyst to be added in oxyalkylation. For instance, if a nonvolatile strong acid such as sulfuric acid is used to catalyze the resinification reaction, presumably after being converted into a sulfonic acid, it may be necessary and is usually advantageous to add an amount of alkali equal stoichiometrically to such acidity, and include added alkali over and above this amount as the alkaline catalyst.

It is advantageous to conduct the oxyethylation or oxypropylation in the presence of an inert solvent such as xylene, cymene, decalin, ethylene glycol diethylether, diethyleneglycol diethylether, or the like, although with many resins, the oxyalkylation proceeds satisfactorily without a solvent. Since xylene is cheap and may be permitted to be present in the final product used as a demulsifier, it is our preference to use xylene. This is particularly true in the manufacture of products from low-stage resins, i. e., of 3 and up to and including 7 units per molecule.

If a xylene solution is used in an autoclave as hereinafter indicated, the pressure readings of course represent total pressure, that is, the combined pressure due to xylene and also due to ethylene or propylene oxide. Under such circumstances it may be necessary at times to use substantial pressures to obtain effective results, for instance, pressure up to 300 pounds along with correspondingly high temperatures, if required.

However, even in the instance of high-melting resins, a solvent such as xylene can be eliminated in either one of two ways: After the introduction of approximately 2 or 3 moles of ethylene oxide, for example, per phenolic nucleus, there is a definite drop in the hardness and melting point of the resin. At this stage, if xylene or a similar solvent has been added, it can be eliminated by distillation (vacuum distillation if desired) and the subsequent intermediate, being comparatively soft and solvent-free, can be reacted further in the usual manner with ethylene oxide or some other suitable reactant.

Another procedure is to continue the reaction to completion with such solvent present and then eliminate the solvent by distillation in the customary manner.

Attention is directed to the fact that the resins herein described must be fusible or soluble in an organic solvent. Fusible resins invariably are soluble in one or more organic solvents, such as those mentioned elsewhere herein. It is to be emphasized, however, that the organic solvent employed to indicate or assure that the resin meets this requirement need not be the one used in oxyalkylation. Indeed solvents which are susceptible to oxyalkylation are included in this group of organic solvents. Examples of such solvents are alcohol and alcohol-ethers. However, where a resin is soluble in an organic solvent, there are usually available other organic solvents which are not susceptible to oxyalkylation, useful for the oxyalkylation step. In any event, the organic solvent-soluble resin can be finely powdered, for instance, to 100 to 200 mesh, and a slurry or suspension prepared in xylene or the like, and subjected to oxyalkylation. The fact that the resin is soluble in an organic solvent, or the fact that it is fusible, means that it consists of separate molecules. Phenol-aldehyde resins of the type herein specified possess reactive hydroxyl groups and are oxyalkylation susceptible.

Based on molecular weight determinations, most of the resins used, particularly in the absence of a secondary heating step, contain 3 to 6 or 7 phenolic nuclei with approximately 4½ or 5½ nuclei as an average. More drastic conditions of resinification yield resins of greater chain length. Such more intensive resinification is a conventional procedure and may be employed if desired. Molecular weight, of course, is measured by any suitable procedure, particularly by cryoscopic methods; but using the same reactants and using more drastic conditions of resinification one usually finds that higher molecular weights are indicated by higher melting points of the resins and a tendency to decreased solubility.

Either an alkaline or acid catalyst is advantageously used in preparing the resin. A combination of catalysts is sometimes used in two stages; for instance, an alkaline catalyst is sometimes employed in a first stage, followed by neutralization and addition of a small amount of acid catalyst in a second stage. It is generally believed that even in the presence of an alkaline catalyst, the number of moles of aldehyde, such as formaldehyde, must be greater than the moles of phenol employed in order to introduce methylol groups in the intermediate stage. There is no indication that such groups appear in the final resin if prepared by the use of an acid catalyst. It is possible that such groups may appear in the finished resins prepared solely with an alkaline catalyst; but we have never been able to confirm this fact in an examination of a large number of resins prepared by ourselves. Our preference, however, is to use an acid-catalyzed resin, particularly employing a formaldehyde-to-phenol ratio of 0.95 to 1.20 and, as far as we have been able to determine, such resins are free from methylol groups. As a matter of fact, it is probable that in acid-catalyzed resinifications, the methylol structure may appear only momentarily at the very beginning of the reaction and in all probability is converted at once into a more complex structure during the intermediate stage.

One procedure which can be employed in the use of a new resin to prepare products for use in the process of the invention is to determine the hydroxyl value by the Verley-Bölsing method or its equivalent. The resin as such, or in the form of a solution, as described, was then treated with a mixture of ethylene oxide and propylene oxide in presence of 0.5% to 2% of sodium methylate as a catalyst in step-wise fashion. The ratios of propylene oxide and ethylene oxide employed correspond to the ratios in the limiting points on the triangular graph, to wit, points 1, 2, 3. Our preference is to use the propylene oxide and then the ethylene oxide, although useful products are obtained by using ethylene oxide and then propylene oxide or by carrying out the oxyalkylation with the use of the two oxides at the same time.

Attention is directed to the fact that in the subsequent examples reference is made to the step-wise addition of the alkylene oxide, such as ethylene oxide. It is understood, of course, there is no objection to the continuous addition of alkylene oxide until the desired stage of reaction is reached. In fact, there may be less of a hazard involved and it is often advantageous to add the alkylene oxide, or mixture, slowly in a continuous stream and in such amount as to avoid exceeding the higher pressures noted in the various examples or elsewhere.

It may be well to emphasize the fact that when resins are produced from difunctional phenols and some of the higher aliphatic aldehydes, such as acetaldehyde, the resultant is a comparatively soft or pitch-like resin at ordinary temperatures. Such resins become comparatively fluid at 110° to 165° C., as a rule, and thus can be readily oxyalkylated, without the use of a solvent.

Ordinarily, the oxyalkylation is carried out in autoclaves provided with agitators or stirring devices. We have found that the speed of the agitation markedly influences the time reaction. In some cases, the change from slow speed agitation, for example, in a laboratory autoclave, with a stirrer operating at a speed of 60 to 200 R. P. M., to high speed agitation with the stirrer operating at 250 to 350 R. P. M., reduces the time required for oxyalkylation by one-half to two-thirds. Frequently xylene-soluble products which give insoluble products by procedures employing comparatively slow speed agitation, give suitable hydrophile products when produced by similar procedure, but with high speed agitation, as a result, we believe, of the reduction in the time required, with consequent elimination or curtailment of opportunity for curing or etherization. Even if the formation of an insoluble product is not involved, it is frequently advantageous to speed up the reaction, thereby reducing production time, by increasing agitating speed. In large scale operations, we have demonstrated that economical manufacturing results from continuous oxyalkylation, i. e., an operation in which the alkylene oxide is continuously fed to the reaction vessel, with high speed agitation, i. e., an agitator operating at 250 to 350 R. P. M. Continuous oxyalkylation, other conditions being the same, is more rapid than batch oxyalkylation, but the latter is ordinarily more convenient for laboratory operation.

In the continuous addition of ethylene oxide we have employed either a cylinder of ethylene oxide without added nitrogen, provided that the pressure of the ethylene oxide was sufficiently great to pass into the autoclave, or we have used an arrangement, which, in essence, was the equivalent of an ethylene oxide cylinder with a means for injecting nitrogen so as to force the ethylene oxide in the manner of an ordinary Seltzer bottle, combined with the means for either weighing the cylinder or measuring the ethylene oxide used volumetrically. In the case of propylene oxide we invariably used nitrogen pressure to cause the oxide to move into the autoclave.

Such procedure and arrangement for injecting liquids is, of course, conventional. In adding ethylene oxide or propylene oxide continuously, there is one precaution which must be taken at all times. The addition of the oxide must stop immediately if there is any indication that reaction is stopped, or, obviously, if reaction is not started at the beginning of the reaction period. Since the addition of ethylene oxide is invariably an exothermic reaction, whether or not reaction has taken place, can be judged in the usual manner by observing (a) temperature rise or drop, if any; and (b) amount of cooling water or other means required to dissipate heat of reaction; thus, if there is a temperature drop without the use of cooling water or equivalent, or if there is no rise in temperature without using cooling water control, careful investigation should be made.

The resins employed are prepared in the manner described in various examples, Nos. 1a through 103a, of our said Patent 2,499,370. Instead of being prepared on a laboratory scale, they were prepared in 10 to 15-gallon electro-vapor-heated synthetic resin pilot plant reactors, as manufactured by the Blaw-Knox Company, Pittsburgh, Pennsylvania, and completely described in their Bulletin No. 2087, issued in 1947, with specific reference to Specification No. 71—3965.

In preparing the derivatives we have used the following procedure throughout. Prepare the resins with a certain amount of solvent, such as xylene, present purely as a convenience. We have treated the resins with propylene oxide and ethylene oxide in three different ways:

(a) Add the ethylene oxide first and then the propylene oxide;

(b) Add the propylene oxide first and then the ethylene oxide; and (c) Use a mixture of propylene oxide and ethylene oxide, and make a single addition.

In each case we have used an alkaline catalyst equivalent to approximately one-half percent to 1% of the total reaction mass in the final stage, or equivalent to one-fourth percent of alkaline catalyst based on final compound.

A number of resins were employed from a series of those resins which could be manufactured from commercially available phenols and aldehydes, such as Examples 1a, 2a, 3a, 4a, 5a, 24a, 25a, of Patent 2,499,370 and similar resins obtained from octyl phenol, nonyl phenol, etc.

The commercially available aldehydes used were formaldehyde, furfural, acetaldehyde, heptaldehyde, and propionaldehyde. The relative proportions of the materials are those indicated of the point 2 on the conventional triangular chart or graph of the attached figure. In this chart each vertex represented 100% of the material indicated, i. e., a phenol-aldehyde resin, ethylene oxide, or propylene oxide. Points in the area represent composition indicated in the usual manner.

Our exploration of products containing various proportions of the three constituents revealed that the most effective compositions from the standpoint of demulsification and, we believe, for other purposes, were found within three relatively restricted areas, of which one is the area 1, 2, 3, the products represented by which are the subject matter of this, while the products represented by the other two are the subject matter of other applications filed concurrently herewith.

We prepared a series of five different phenol-formaldehyde resins, using tertiary amyl phenol, tertiary butyl phenol, tertiary octyl phenol, tertiary nonyl phenol and menthyl phenol, and oxyalkylated them in the proportions of one pound of resin to two and one-half pounds of ethylene oxide to twenty-one and one-half pounds of propylene oxide, using twenty-five pounds of xylene as a solvent and two ounces of flake caustic soda as catalyst. The oxyalkylation of each of the resins was carried out in three different ways:

(a) Adding all the ethylene oxide first and then the propylene oxide;

(b) Adding the propylene oxide first and then the ethylene oxide;

(c) Mixing the two oxides and adding them simultaneously.

We have prepared also a number of similar derivatives in which another aldehyde, such as acetaldehyde, propionic aldehyde, or furfural, replace formaldehyde. What is said in regard to derivatives prepared from formaldehyde is also true in regard to derivatives prepared from the same, or various phenols and these other aldehydes. The subsequent oxyalkylation step, or steps, were the same. What has been said in regard to the effectiveness of derivatives derived from resins in which formaldehyde enters into the manufacture, is true also in regard to resins in which these other aldehydes are used.

We again desire to point out that the amount of alkaline catalyst used is not critical. This is true whether the catalyst be caustic soda, caustic potash, sodium methylate, or any other suitable catalyst. The amount which we regularly employed has varied from 1%, based on the resin alone, to 1% based on the resin and oxides, although in many cases, the reaction has been speeded up by using approximately twice this amount of caustic. We are inclined to believe that whenever the amount of caustic represents more than 2% of the reactants present, ignoring inert solvent, that there may be some tendency to form cyclic polymers with the alkylene oxide, although this is purely a matter of speculation. For this reason, whether justified or not, we have usually avoided use of excess amounts of catalyst.

As we have stated, products of usual value are produced when their compositions are such that the three components are in proportions represented by the area 1, 2, 3 on the appended drawing. We have prepared a number of derivatives which come within this area and such derivatives are most effective demulsifiers, and effective for other purposes.

It is understood, of course, in each instance the composition is based on the assumption that the percentage by weight basis is on a statistical basis, which it obviously must be, and assumes completeness of reaction.

Having thus described our invention, what we claim as new and desire to secure by Letters Patent is:

1. Hydrophile synthetic products, said hydrophile synthetic products being oxyalkylation products of (a) both ethylene oxide and propylene oxide; and (b) an oxyalkylation-susceptible, fusible, organic solvent-soluble, water-insoluble phenol-aldehyde resin; said resin being derived by reaction between a difunctional monohydric phenol and an aldehyde having not over 8 carbon atoms and having one functional group reactive toward said phenol; said resin being formed in the substantial absence of trifunctional phenols; said phenol being of the formula:

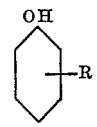

in which R is a hydrocarbon radical having at least 4 and not more than 14 carbon atoms and substituted in one of the positions ortho and para; said oxyalkylated resin being characterized by the introduction into the resin molecule of a plurality of divalent $C_2H_4O$ and $C_3H_6O$ radicals, with the proviso that the composition of said hydrophile synthetic products, based on a statistical average and assuming completeness of reaction, and calculated back to the three oxyalkylation step reactants, i. e., resin, ethylene oxide and propylene oxide, on a percentage weight basis must fall approximately within the area defined by the points 1, 2, 3 of the chart in the accompanying drawing.

2. The product of claim 1 wherein the aldehyde is formaldehyde.

3. The product of claim 1 wherein the aldehyde is formaldehyde and R is a butyl radical.

4. The product of claim 1 wherein the aldehyde is formaldehyde and R is an amyl radical.

5. The product of claim 1 wherein the aldehyde is formaldehyde and R is a nonyl radical.

MELVIN DE GROOTE.
BERNHARD KEISER.

REFERENCES CITED

The following references are of record in the file of this patent:

UNITED STATES PATENTS

| Number | Name | Date |
|---|---|---|
| 2,076,624 | De Groote | Apr. 13, 1937 |
| 2,454,541 | Bock | Nov. 23, 1948 |
| 2,501,015 | Wirtel | Mar. 21, 1950 |